United States Patent
Lee

(10) Patent No.: US 11,085,354 B2
(45) Date of Patent: Aug. 10, 2021

(54) CONTROL METHOD FOR INTEGRATED THERMAL MANAGEMENT SYSTEM OF VEHICLE

(71) Applicants: Hyundai Motor Company, Seoul (KR); Kia Motors Corporation, Seoul (KR)

(72) Inventor: Jang Hyo Lee, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 135 days.

(21) Appl. No.: 16/591,308

(22) Filed: Oct. 2, 2019

(65) Prior Publication Data
US 2020/0362746 A1    Nov. 19, 2020

(30) Foreign Application Priority Data
May 17, 2019 (KR) .................. 10-2019-0057783

(51) Int. Cl.
*F01P 7/14* (2006.01)
(52) U.S. Cl.
CPC .......... *F01P 7/14* (2013.01); *F01P 2007/146* (2013.01); *F01P 2025/04* (2013.01); *F01P 2025/13* (2013.01); *F01P 2025/32* (2013.01)

(58) Field of Classification Search
CPC .... F01P 7/14; F01P 2007/146; F01P 2025/32; F01P 2025/04; F01P 2025/13; F01P 2025/30; F01P 2025/31; F01P 2025/50
See application file for complete search history.

(56) References Cited

U.S. PATENT DOCUMENTS

| | | | |
|---|---|---|---|
| 5,957,663 A * | 9/1999 | Van Houten | F01P 7/048 417/13 |
| 2018/0087450 A1* | 3/2018 | Karnik | B60H 1/32281 |

* cited by examiner

*Primary Examiner* — Jacob M Amick
(74) *Attorney, Agent, or Firm* — Mintz Levin Cohn Ferris Glovsky and Popeo, P.C.; Peter F. Corless

(57) ABSTRACT

A control method for an integrated thermal management system of a vehicle includes: comparing an engine coolant temperature with a predetermined first set temperature after vehicle start; when the engine coolant temperature is greater than the first set temperature, comparing an ambient temperature with a set ambient temperature and comparing an air conditioner refrigerant pressure with a set pressure; and when the ambient temperature is greater than the set ambient temperature and the air conditioner refrigerant pressure is greater than the set pressure, controlling opening and closing operations of an integrated flow control valve based on the air conditioner refrigerant pressure so as to increase a flow rate of coolant that is supplied to a radiator through the integrated flow control valve.

10 Claims, 4 Drawing Sheets

CONTROL METHOD FOR INTEGRATED THERMAL MANAGEMENT SYSTEM OF VEHICLE

CROSS REFERENCE TO RELATED APPLICATION

The present application claims under 35 U.S.C. § 119(a) the benefit of Korean Patent Application No. 10-2019-0057783, filed May 17, 2019, the entire contents of which are incorporated by reference herein.

BACKGROUND

(a) Technical Field

The present disclosure relates to a control method for an integrated thermal management system of a vehicle, more particularly, to the control method in which coolant flow rate control based on air conditioner refrigerant pressure is performed, whereby it is possible to prevent a rise in engine coolant temperature and an excessive rise in the refrigerant pressure.

(b) Description of the Related Art

Generally, in a vehicle, coolant is used to prevent an engine from overheating or supercooling. To cool the engine, heat absorbed by the coolant from the engine is released in a radiator while the coolant circulates between the engine and the radiator.

That is, the coolant heated in the engine is cooled in the radiator, and then the coolant cooled in the radiator cools the engine again, whereby the engine temperature is controlled to an operating temperature at which engine output is maximized.

The coolant discharged from the engine may be transferred to the radiator through an integrated valve device (hereinafter referred to as "integrated flow control valve") of an integrated thermal management system (ITM).

Recently, a technique of improving fuel efficiency by warming up the engine in cold start conditions by using engine heat has been developed and applied.

The actual output obtained through combustion in the engine is about 30% of the theoretical thermal efficiency, which is due to losses occurring in the engine. The major losses occurring in the engine are cooling losses, exhaust losses, unburned losses, mechanical friction losses, pumping losses, and the like.

Engine thermal management refers to a technology that uses most heat generated in the engine during a cold start to warm up the engine and also controls the engine temperature to the optimum operating temperature by using coolant, thus improving fuel efficiency and engine output and achieving exhaust emission reduction effect.

Known technologies for such engine thermal management include electronic thermostats, variable split cooling, integrated flow control valves, variable water pumps, flow improvements, and the like.

Further, in some vehicles, an integrated thermal management system has been used. Such a system is to provide integrated control of coolant flow rate and a cooling circuit for the purpose of efficient thermal management between vehicle components in use of engine coolant.

An integrated thermal management system of a vehicle is a system for rapidly warming up the engine by controlling coolant flow direction and flow rate using an integrated flow control valve, and for implementing an integrated thermal management function through control of the optimum coolant temperature.

Such an integrated thermal management system includes a circuit configuration for performing heat exchange between engine coolant and transmission oil or recovering exhaust heat to be used for vehicle interior heating or engine warm-up during initial driving, and includes valves for properly controlling coolant flow rate.

In the integrated thermal management system, the integrated flow control valve is used to control the coolant temperature to the optimum temperature by controlling coolant flow based on a driving state of a vehicle. For example, the integrated flow control valve is used to perform coolant temperature up control during driving at low and medium speed and perform coolant temperature down control during driving at high speed and high load.

An integrated flow control valve known in the art has one inlet port and three outlet ports, and is designed to control the flow rate of coolant for each outlet port. To control the flow rate of coolant, a valve opening ratio of each port is controlled by controlling the rotation angle of a DC motor.

In particular, due to the fact that the integrated flow control valve is a valve using a motor, accurate information on a hardware position of the motor is required for precise control of coolant temperature, and a position sensor is provided for this purpose.

That is, the flow rate of coolant for each outlet port is precisely controlled by accurately controlling the rotation angle of the motor based on detection information of the position sensor, thus precisely controlling the coolant temperature.

While the integrated flow control valve in the related art enables rapid engine warm-up, maximization of exhaust heat recovery effect, control of optimum coolant temperature, and maximization of fuel efficiency, there is a problem in that only the ambient temperature and coolant temperature are variables in controlling the integrated flow control valve, and thus efficient control may be impossible in an air conditioning mode required by a driver.

In particular, in air conditioning control in the air conditioning mode required by a driver, a compressor is operated to fulfill a required cooling load. Due to this, as the cooling load increases, the air conditioner refrigerant pressure may rise.

While efficient cooling air generation is possible when an appropriate refrigerant pressure is maintained, when the engine coolant temperature rises, an air conditioner condenser disposed close to the radiator may be deteriorated in cooling performance, resulting in the air conditioner refrigerant pressure rising together with the engine coolant temperature.

As described above, the air conditioner refrigerant pressure is related to the coolant temperature and the radiator temperature. However, according to the related art, there is no thermal control technology for preventing an excessive rise in the refrigerant pressure.

For example, during warm weather conditions (e.g., summer) when the ambient temperature is high, when interior air conditioning is performed at an air conditioning target temperature set by a user in a vehicle, a required torque in the vehicle increases due to uphill driving, towing, an increase in electrical load, and the like. In this case, the engine coolant temperature rises, and at this time, the air conditioner refrigerant pressure also rises due to such a rise in the engine coolant temperature even under the same vehicle speed and the same cooling load conditions.

When the engine coolant temperature rises as described above, the radiator temperature rises, leading to a deterioration in cooling efficiency and cooling performance in the air conditioner condenser. As a result, the air conditioning refrigerant pressure rises and interior air conditioning efficiency, and performance of the vehicle may be deteriorated.

Therefore, there is a demand for a control technique that can prevent the engine coolant temperature from rising by recognizing that the cooling load is high when the air conditioner refrigerant pressure rises above a predetermined level.

SUMMARY

Accordingly, the present disclosure provides a control method for an integrated thermal management system of a vehicle, in which coolant flow rate control based on air conditioner refrigerant pressure is performed by reflecting the refrigerant pressure as a control variable, thus preventing a rise in engine coolant temperature and an excessive rise in the refrigerant pressure, achieving improvement of cooling efficiency and cooling performance (condensation performance) in a condenser, and achieving improvement of air conditioning performance and merchantability of the vehicle.

In order to achieve the above objective, according to one aspect of the present disclosure, there is provided a control method for an integrated thermal management system of a vehicle, the method including: comparing an engine coolant temperature with a predetermined first set temperature after vehicle start; when the engine coolant temperature is greater than the first set temperature, comparing an ambient temperature with a set ambient temperature and comparing an air conditioner refrigerant pressure with a set pressure; and when the ambient temperature is greater than the set ambient temperature and the air conditioner refrigerant pressure is greater than the set pressure, controlling opening and closing operations of an integrated flow control valve based on the air conditioner refrigerant pressure so as to increase a flow rate of coolant that is supplied to a radiator through the integrated flow control valve.

In the comparing the ambient temperature with the set ambient temperature and comparing the air conditioner refrigerant pressure with the set pressure, it may be determined that an air conditioning blower is in an on-state, and when the ambient temperature is greater than the set ambient temperature, the air conditioner refrigerant pressure is greater than the set pressure, and the air conditioning blower is in the on-state, in the controlling the opening and closing operations of the integrated flow control valve based on the air conditioner refrigerant pressure, the opening and closing operations of the integrated flow control valve may be controlled based on the air conditioner refrigerant pressure.

The method may further include when any one of a condition that the ambient temperature is greater than the set ambient temperature, a condition that the air conditioner refrigerant pressure is greater than the set pressure, and a condition that the air conditioning blower is in the on-state is not fulfilled, controlling the opening and closing operations of the integrated flow control valve based on the engine coolant temperature.

In the controlling the opening and closing operations of the integrated flow control valve based on the engine coolant temperature, when the engine coolant temperature is in a range of greater than a second set temperature and less than a third set temperature (the first set temperature<the second set temperature<the third set temperature), the opening and closing operations of the integrated flow control valve may be controlled to allow the coolant to be supplied to an ATF warmer in which the coolant is heat-exchanged with transmission oil, and the flow rate of the coolant supplied to the ATF warmer may be controlled based on the engine coolant temperature.

In the controlling the opening and closing operations of the integrated flow control valve based on the engine coolant temperature, when the engine coolant temperature is in a range of greater than a fourth set temperature and less than a fifth set temperature (the third set temperature<the fourth set temperature<the fifth set temperature), control of the opening and closing operations of the integrated flow control valve may be performed such that the engine coolant temperature follows a target coolant temperature for operating an engine at an engine operating point.

In the controlling the opening and closing operations of the integrated flow control valve based on the engine coolant temperature, when the engine coolant temperature is greater than or equal to the fifth set temperature, the opening and closing operations of the integrated flow control valve may be controlled to allow the cooling water to be supplied to the radiator, and the flow rate of the coolant supplied to the radiator may be controlled based on the engine coolant temperature.

In the controlling the opening and closing operations of the integrated flow control valve based on the air conditioner refrigerant pressure, the opening ratio of the integrated flow control valve may be controlled to be increased when the air conditioner refrigerant pressure rises so as to increase the flow rate of the coolant that is supplied to the radiator.

In the controlling the opening and closing operations of the integrated flow control valve based on the air conditioner refrigerant pressure, the opening ratio of the integrated flow control valve may be controlled to be increased when the air conditioner refrigerant pressure rises so as to increase the flow rate of the coolant that is supplied to the radiator.

In the comparing the engine coolant temperature with the predetermined first set temperature after the vehicle start, when the engine coolant water temperature is less than or equal to the first set temperature, the opening and closing operations of the integrated flow control valve may be controlled to allow the coolant to be supplied to an exhaust heat recovery system, such that the coolant is heated in the exhaust heat recovery system by heat exchange with exhaust gas and then is supplied to an engine for engine warm-up.

Accordingly, in the control method for the integrated thermal management system according to the present disclosure, when the ambient temperature is greater than the air conditioning target temperature set by the driver in a state where the ambient temperature is greater than or equal to a predetermined level, and thus the interior air conditioning is required (with the air conditioning blower on), an integrated thermal management control mode based on the air conditioner refrigerant pressure (cooling priority mode) is entered, thus preventing a deterioration in the condensation performance of the condenser and a rise in the refrigerant pressure.

Therefore, according to the control method for the integrated thermal management system according to the present disclosure, it is possible to prevent an excessive rise in refrigerant pressure, thus improving air conditioning performance and merchantability of the vehicle.

Further, according to the control method for the integrated thermal management system according to the present disclosure, it is possible to efficiently control engine coolant and air conditioner refrigerant pressure in a situation where cooling load is large, to reduce energy consumption of an air conditioner compressor, and to improve real-world fuel efficiency of the vehicle.

A non-transitory computer readable medium containing program instructions executed by a processor can include: program instructions that compare an engine coolant temperature with a predetermined first set temperature after vehicle start; program instructions that, when the engine coolant temperature is greater than the first set temperature, compare an ambient temperature with a set ambient temperature and compare an air conditioner refrigerant pressure with a set pressure; and program instructions that, when the ambient temperature is greater than the set ambient temperature and the air conditioner refrigerant pressure is greater than the set pressure, control opening and closing operations of an integrated flow control valve based on the air conditioner refrigerant pressure so as to increase a flow rate of coolant that is supplied to a radiator through the integrated flow control valve.

BRIEF DESCRIPTION OF THE DRAWINGS

The above and other objectives, features and other advantages of the present disclosure will be more clearly understood from the following detailed description when taken in conjunction with the accompanying drawings, in which.

DETAILED DESCRIPTION OF THE DISCLOSURE

Figure 1:
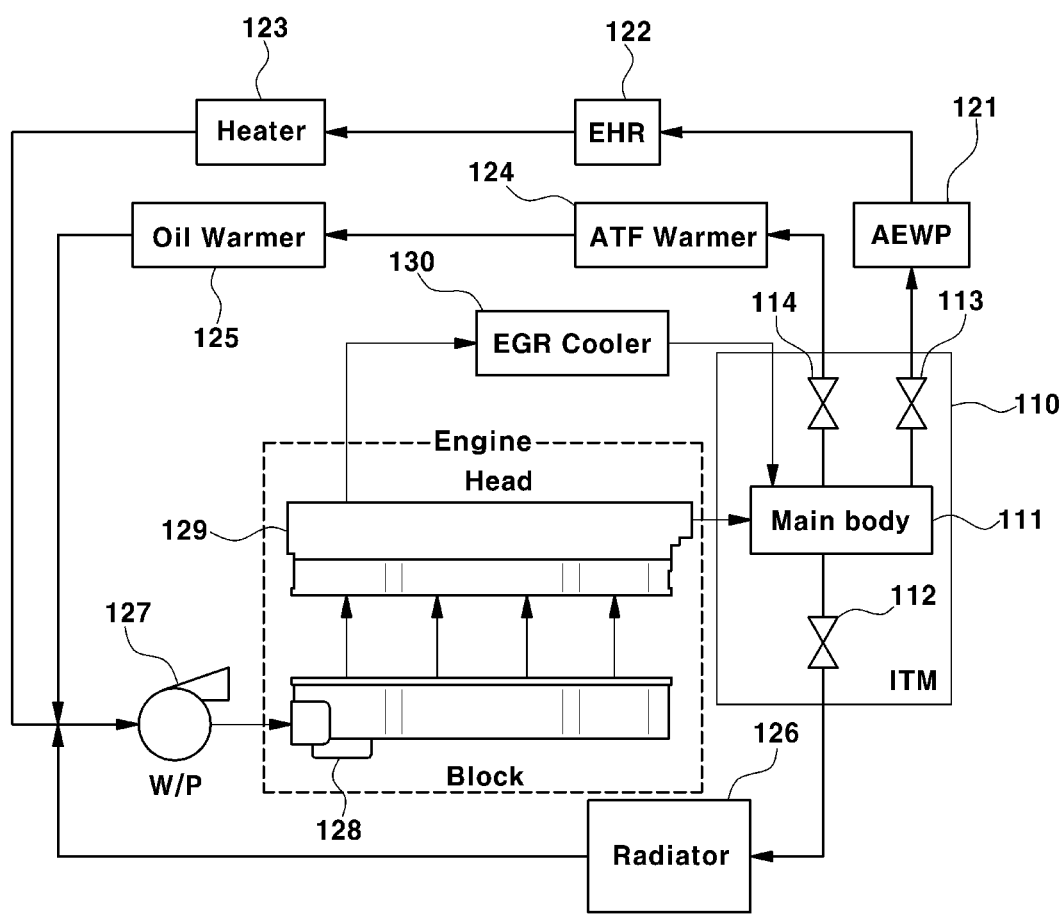
FIG. 1 is a view showing an example of an integrated thermal management system to which a control method according to an embodiment of the present disclosure can be applied.

Hereinbelow, exemplary embodiments of the present disclosure will be described in detail with reference to the accompanying drawings such that the disclosure can be easily embodied by one of ordinary skill in the art to which this disclosure belongs. However, various changes to the following embodiments are possible and the scope of the present disclosure is not limited to the following embodiments.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

In a typical vehicle, a radiator and an air conditioner condenser are disposed close to each other. Accordingly, when an engine cooling water temperature passing through the radiator rises, the temperature of the radiator rises, leading to a deterioration in cooling efficiency and cooling performance (condensation performance) in the closely disposed air conditioner condenser. As a result, the pressure of refrigerant passing through the air conditioner condenser, that is, the air conditioner refrigerant pressure rises, leading to a deterioration in interior air conditioning efficiency and performance of the vehicle.

In one example, in a state where the ambient temperature is high at 41° C. to 45° C. (e.g., during summer), when a vehicle travels at a speed of 100 km/hr with an air conditioning target temperature set by a user at 17° C., and then under the same vehicle speed (100 km/hr) and the same cooling load conditions (ambient temperature of 41° C. to 45° C., air conditioning target temperature of 17° C.), when a required torque of the vehicle increases from 80 Nm to 160 Nm due to uphill driving, towing, an increase in electrical load, etc., the engine coolant temperature may rise from 80° C. to 105° C. At this time, the air conditioner refrigerant pressure may rise from 200 psi to 220 psi due to the increase in engine coolant temperature.

In a known integrated thermal management system (ITM) for a vehicle, an integrated flow control valve is controlled in a cooling priority mode under a condition that the engine coolant temperature is greater than or equal to a set temperature.

When the set temperature is 110° C., control of the integrated flow control valve enters the cooling priority mode under the condition that the engine coolant temperature is greater than or equal to 110° C. However, in the above example, due to the fact that the engine coolant temperature is 105° C., which is less than the set temperature, the cooling priority mode is not entered. As a result, a problem arises that the air conditioning efficiency and performance are deteriorated due to a rise in the air conditioner refrigerant pressure.

In a typical vehicle, a region where the engine coolant temperature is in a range of 95° C. to 105° C. is an engine efficiency optimum control section. However, in the above example, even when the coolant pressure rises excessively as the engine coolant temperature rises to 105° C., the cooling priority mode for lowering the refrigerant pressure is not performed because the condition for entering the cooling priority mode is not fulfilled.

In the related art, in order to improve the cooling performance of the condenser, a method of increasing the size of the condenser or the like is used, which relies only on hardware improvement. However, such hardware improvement alone has limitations in increasing the cooling performance of the condenser.

Accordingly, in an effort to solve the above problem, there is provided a control method of an integrated thermal management system of a vehicle, in which when the refrigerant pressure rises to greater than or equal to a predetermined level due to the cooling load, the engine coolant temperature is lowered to improve the cooling efficiency and cooling performance (condensation performance) in the air conditioner condenser, thus maintaining the refrigerant pressure at an appropriate level.

As an example, the vehicle may be a hybrid vehicle powered by an engine and a motor.

In the present disclosure, when the ambient temperature and the refrigerant pressure are greater than or equal to predetermined levels, a control mode of the integrated thermal management system (ITM) is switched to the cooling priority mode to increase the flow rate of coolant flowing into a radiator, thus preventing the engine coolant temperature from rising and the refrigerant pressure from rising excessively.

FIG. 1 shows an example of an integrated thermal management system to which a control method according to an embodiment of the present disclosure can be applied.

As shown in FIG. 1, the integrated thermal management system includes an integrated flow control valve 110 supplying and distributing coolant to vehicle components for engine and transmission temperature control and for interior air conditioning, and properly controlling flow of the coolant such that heat exchange between the coolant and other media (oil or air) required by each component is performed.

The integrated flow control valve 110 may include one inlet port and three outlet ports connected to a main body 111, and the respective outlet ports may be provided with valves 112, 113, and 114, respectively.

In particular, coolant, which is sent by a water pump 127 and passes through a cylinder block 128 and a cylinder head 129 of the engine, flows into the inlet port of the integrated flow control valve 110 through a coolant line directly or via an exhaust gas recirculation (EGR) cooler 130.

Further, an exhaust heat recovery (EHR) system 122, an automatic transmission fluid (ATF) warmer 124, and a radiator 126 are connected to the respective outlet ports of the integrated flow control valve 110, respectively.

In particular, the EHR system 122 is connected to an exhaust heat recovery valve (second valve) 113 of the integrated flow control valve 110 through the coolant line. The coolant passing through the exhaust heat recovery valve 113 is forced to be sent to the EHR system 122 by an automotive electric water pump (AEWP) 121 and then is heat-exchanged with exhaust gas in the EHR system 122.

Further, the EHR system 122 is connected to a heater core 123 disposed downstream thereof through the coolant line, such that the coolant heated by exhaust heat in the EHR system 122 is supplied to the heater core 123.

As a result, the coolant is heat-exchanged with air while passing through the heater core 123 to heat the air, and the heated air is discharged into the vehicle interior, whereby interior heating is performed.

Meanwhile, the ATF warmer 124 and an oil warmer 125 are connected to an ATF warmer valve (third valve) 114 of the integrated flow control valve 110 through the coolant line.

Accordingly, when the ATF warmer valve 114 is opened, the coolant flows from the integrated flow control valve 110 to the ATF warmer 124 and the oil warmer 125 through the coolant line. At this time, heat exchange is performed between the coolant and transmission oil while the coolant sequentially passes through these warmers 124 and 125.

Further, a radiator valve (first valve) 112 of the integrated flow control valve 110 is connected to a radiator 126 through the coolant line, such that when the radiator valve 112 is opened, the coolant is supplied to the radiator 126 through the coolant line.

Accordingly, heat of the coolant is released from the radiator 126 to the outside by heat exchange between the coolant and outside air. As a result, the coolant cooled in the radiator 126 is returned to the cylinder block 128 of the engine by the water pump 127.

Therefore, in the integrated thermal management system as shown in FIG. 1, the valves 112, 113, and 114 provided in the outlet ports of the integrated flow control valve 110 are controlled based on a vehicle driving state, whereby the flow rate of coolant that is supplied to each component can be controlled.

That is, opening and closing operations of the first valve which is the radiator valve 112, the second valve which is the exhaust heat recovery valve 113, and the third valve which is the ATF warmer valve 114 are properly controlled based on the vehicle driving state, whereby optimum thermal management control of the vehicle can be realized.

Figure 2:
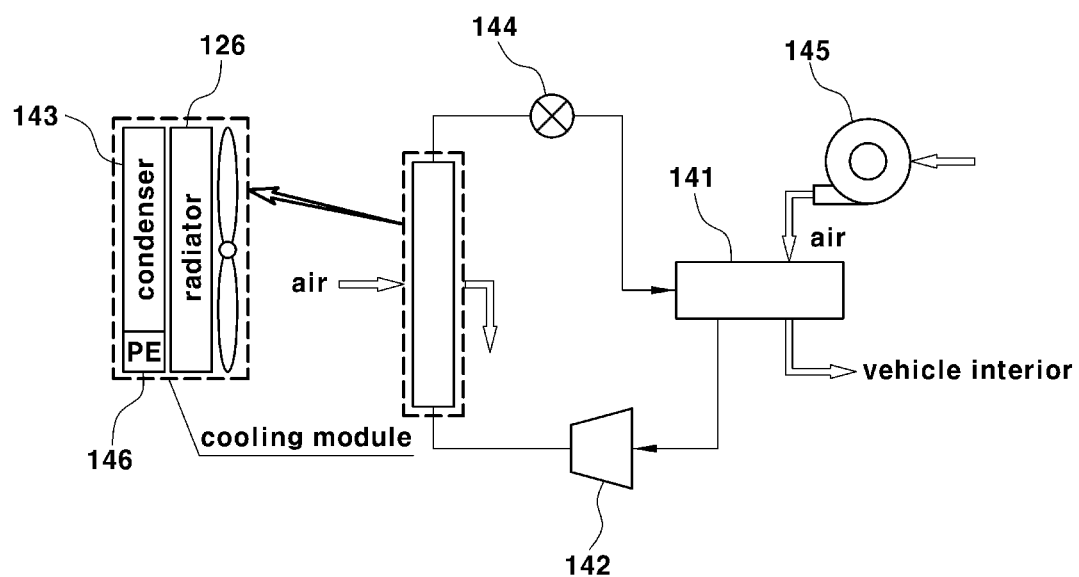
FIG. 2 is a view showing a configuration of an air conditioning system in a vehicle to which the control method according to the present disclosure is applied.

Next, FIG. 2 is a view showing a configuration of an air conditioning system in a vehicle to which the control method according to the present disclosure is applied. The configuration of the air conditioner system shown in FIG. 2 is not different from a known configuration.

That is, the air conditioning system largely includes an evaporator 141, a compressor 142, a condenser 143, and an expansion valve 144. Refrigerant that is discharged from the condenser 143 undergoes phase change to a vapor while passing through the expansion valve 144.

Thereafter, the refrigerant is evaporated into gas through heat exchange with air while passing through the evaporator 141. The evaporating refrigerant removes heat from air that is sent to the evaporator 141 from an air conditioning blower 145 and cools the air.

Then, the cooled air is discharged into the vehicle interior, whereby interior air conditioning is performed.

The refrigerant that is discharged from the evaporator 141 enters the compressor 142 and is compressed to high temperature and high pressure while passing through the compressor 142. Then, the refrigerant is condensed through heat exchange with air while passing through the condenser 143.

In such a configuration of the air conditioning system, due to the fact that the condenser 143 is disposed close to the radiator 126 as described above, when the temperature of the radiator 126 rises due to a rise in the engine cooling water temperature, the cooling efficiency and the cooling performance (condensation performance) in the condenser 143 are deteriorated, resulting in the refrigerant pressure increasing.

Further, although not shown in the drawings, a cooling circuit for cooling power electronics (PE) components including power converters such as an inverter and a converter may be provided in the vehicle.

The cooling circuit includes a PE cooler 146 in which a cooling fluid for cooling the PE components is heat-exchanged with air while passing therethrough. As shown in FIG. 2, the PE cooler 146 also may be disposed close to the radiator 126.

Meanwhile, in the integrated thermal management system, opening ratios of the valves are controlled based on the ambient temperature and the engine coolant temperature. However, even when the engine coolant temperature is not high in a state where the ambient temperature and the refrigerant pressure are greater than or equal to predetermined levels, it is necessary to control an opening ratio of the radiator valve 112 to increase to prevent the engine coolant temperature from rising.

Accordingly, in the present disclosure, the integrated thermal management system is controlled in consideration of the air conditioner refrigerant pressure, and when the refrigerant pressure rises due to the cooling load, the engine coolant temperature is lowered to ensure the condensation performance in the condenser 143.

Figure 3:
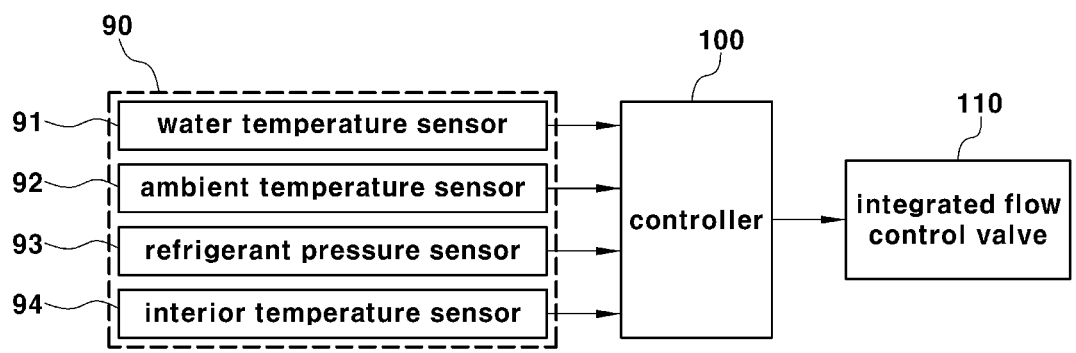
FIG. 3 is a block diagram showing a configuration of an apparatus for performing a control process of an integrated thermal management system according to an embodiment of the present disclosure.
Figure 4A:
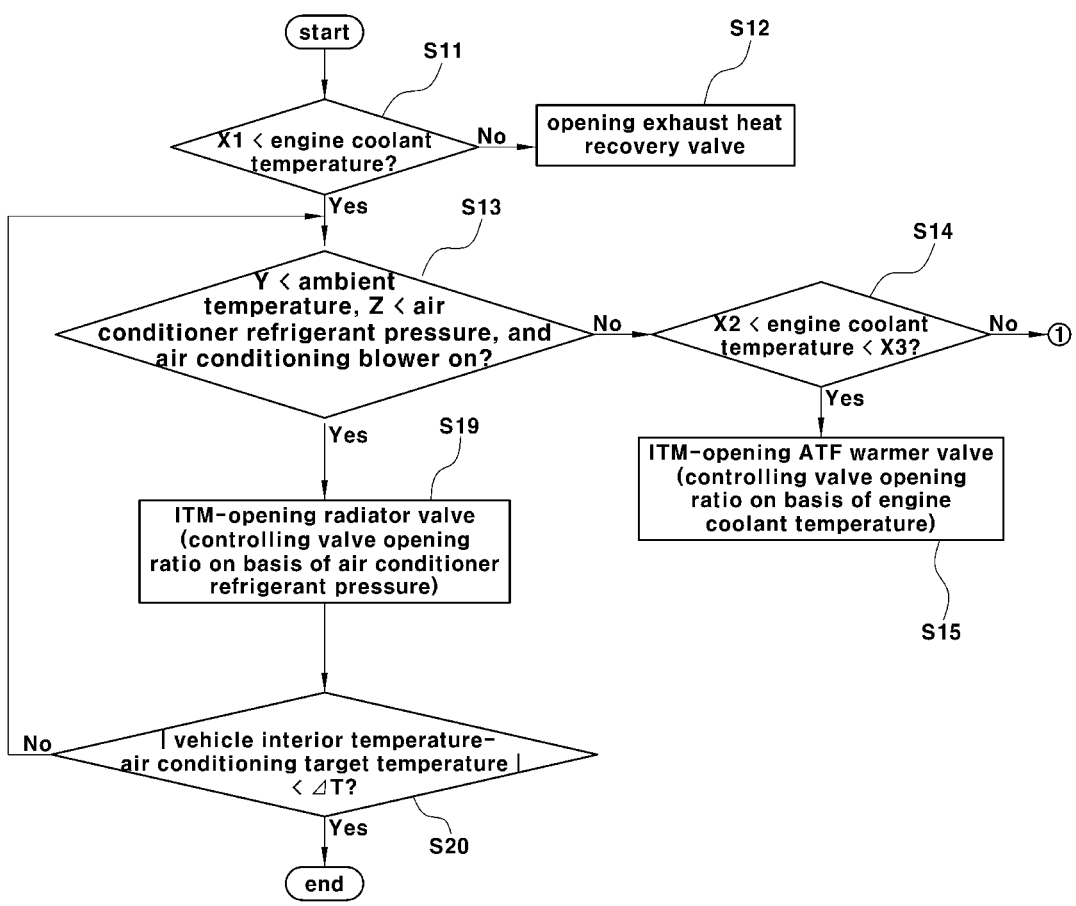
FIGS. 4A-4B are a flowchart showing the control process of the integrated thermal management system according to the embodiment of the present disclosure.
Figure 4B:
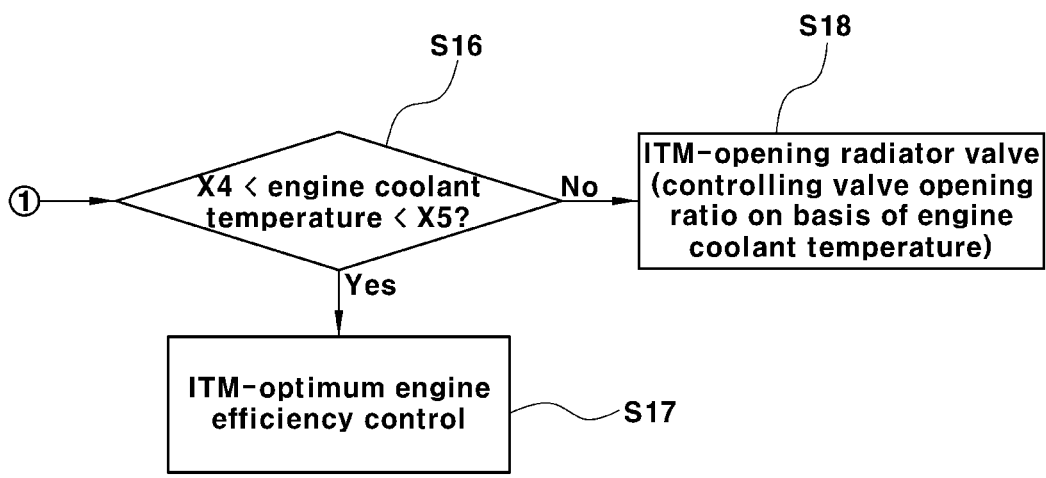

FIG. 3 is a block diagram showing a configuration of an apparatus for performing a control process of an integrated thermal management system according to an embodiment of the present disclosure. FIGS. 4A-4B are a flowchart showing the control process of the integrated thermal management system according to the embodiment of the present disclosure. The control process according to the embodiment of the present disclosure will be described as follows.

Referring to FIG. 3, the apparatus includes a driving information detector 90 for detecting vehicle driving state information, a controller 100 for outputting a control signal for controlling engine coolant temperature and coolant flow rate based on the information detected by the driving information detector 90; and an integrated flow control valve 110 controlled in opening and closing operations in response to the control signal output from the controller 100.

In the embodiment of the present disclosure, the vehicle driving state information includes engine coolant temperature, ambient temperature, air conditioner refrigerant pressure, and vehicle interior temperature, and the driving information detector 90 includes sensors for detecting such information in real time.

In particular, in the embodiment of the present disclosure, the driving information detector 90 may include a water temperature sensor 91 for detecting the engine coolant temperature, an ambient temperature sensor 92 for detecting the ambient temperature, a refrigerant pressure sensor 93 for detecting the air conditioner refrigerant pressure, and an interior temperature sensor 94 for detecting the vehicle interior temperature.

Further, the controller 100 generates and outputs a control signal for controlling the integrated flow control valve 110 based on the information detected by the driving information detector 90, that is, the information of the engine coolant temperature, the ambient temperature, the refrigerant pressure, and the vehicle interior temperature, which is real-time information on the vehicle driving state.

Accordingly, the opening and closing operations of the integrated flow control valve 110 are controlled in response to the control signal output from the controller 100. In particular, in the configuration of FIG. 3, valves of the integrated flow control valve 110, that is, a first valve 112, a second valve 113, and a third valve 114, are controlled in the opening and closing operations in response to the control signal of the controller 110.

In FIGS. 4A-4B, a detailed control process for controlling each valve for thermal management control in the integrated thermal management system of FIG. 1 is shown.

As shown in FIG. 4A, in S11, the controller 100 determines whether the engine coolant temperature is in a low temperature state less than or equal to a set level after engine start of the vehicle, that is, a low temperature state in which the engine is initially started and engine warm-up is required.

To this end, in S11, the controller 200 compares the engine coolant temperature detected by the water temperature sensor 91 with a predetermined first set temperature X1. Then, when the detected engine coolant temperature is less than or equal to the first set temperature X1, in S12, the controller 100 opens the exhaust heat recovery valve 113, which is the second valve of the integrated flow control valve 110.

Herein, the first set temperature X1 is set to a low temperature sufficient to determine whether the engine warm-up is required.

In the present disclosure, set temperatures to be described later are set in advance in the controller 100 to fulfill a relationship of: first set temperature<second set temperature<third set temperature<fourth set temperature<fifth set temperature.

Accordingly, rapid engine warm-up can be achieved through exhaust heat recovery. When the controller 100 opens the exhaust heat recovery valve 113, coolant is supplied from the integrated flow control valve 110 to the EHR system 122 by the AEWP 121. Then, the coolant is heated by heat exchange with exhaust gas while passing through the EHR system 122.

The heated coolant is supplied to the cylinder block 128 and the cylinder head 129 of the engine after passing through the heater core 123 and the water pump 127, thus raising the engine temperature. As a result, the engine warmed up through exhaust heat recovery after engine start as described above can rapidly reach the optimum operating temperature.

On the other hand, when it is determined that the engine coolant temperature is greater than the first set temperature X1 in S11, in S13, the controller 100 compares the ambient temperature detected by the ambient air temperature sensor 92 with a predetermined set ambient temperature Y, and at the same time, compares the refrigerant pressure detected by the refrigerant pressure sensor 93 with a predetermined set pressure Z.

At this time, when both a condition that the detected ambient temperature is greater than the set ambient temperature Y and a condition that the detected refrigerant pressure is greater than the set pressure Z are fulfilled, the controller 100 performs cooling priority mode control for the integrated thermal management system in S19.

Fundamentally, in the cooling priority mode, when the ambient temperature is greater than the set ambient temperature Y and the air conditioner refrigerant pressure is greater than the set pressure Z, opening and closing operations of the integrated flow control valve 110 are controlled based on the air conditioner refrigerant pressure so as to increase the flow rate of coolant that is supplied to the radiator 126 through the integrated flow control valve 110.

Preferably, in S13, the controller 100 further determines whether the air conditioning blower 145 is in an on-state for air conditioning. Then, when such a condition that air conditioning blower 145 is in the on-state is fulfilled together with the above two conditions, the controller 100 performs the cooling priority mode control in S19.

When the cooling priority mode is entered, the controller 100 opens the radiator valve 112, which is the first valve of the integrated flow control valve 110, and controls the opening ratio of the radiator valve 112 based on the detected refrigerant pressure.

That is, when all of the above conditions are fulfilled, it is determined that a cooling load greater than or equal to a predetermined level is generated, and integrated thermal management control based on the refrigerant pressure is entered. The controller 100 determines the opening ratio (%) of the radiator valve 112 based on a refrigerant pressure state and then controls opening and closing operations of the radiator valve 112 at the determined opening ratio (%), thus controlling the flow rate of coolant that is supplied to the radiator 126.

Table 1 below shows setting information of the opening ratio (%) of the radiator valve 112 that is set based on the air conditioner refrigerant pressure (psi). As shown in Table 1, the setting information may be obtained by setting the opening ratio (%) of the radiator valve 112 to a predetermined value for each section of the refrigerant pressure.

TABLE 1

| | low pressure | | medium pressure | | high pressure |
|---|---|---|---|---|---|
| refrigerant pressure P1(psi) | P1 < 180 | 180 ≤ P1 < 200 | 200 ≤ P1 < 220 | 220 ≤ P1 < 250 | 250 ≤ P1 |
| valve opening ratio(%) | 50 | 70 | 80 | 90 | 100 (full open) |

Referring to the setting information in Table 1, multiple refrigerant pressure sections are set by dividing the air conditioner refrigerant pressure into multiple stages, that is, predetermined pressure ranges, and a target valve opening ratio (%), that is, an opening ratio target value for the radiator valve 112 is set for each section.

Accordingly, the controller 100 can determine whether the refrigerant pressure state is low pressure, medium pressure, and high pressure based on a current refrigerant pressure detected by the refrigerant pressure sensor 93 using the setting information shown in Table 1 and then can determine a valve opening ratio according to the determined refrigerant pressure state.

At this time, as shown in Table 1, a medium pressure section may be subdivided into multiple sections. Depending on the current refrigerant pressure, one of several subdivided sections may be selected in the medium pressure section, and a valve opening ratio (%) corresponding to the selected section may be determined.

Referring to Table 1, the greater the stage and section of the refrigerant pressure, the larger the value of the valve opening ratio (%). This means that as the refrigerant pressure increases, the opening ratio of the radiator valve 112 is allowed to be increased, such that when the refrigerant pressure is high, the opening ratio of the radiator valve 112 is increased to supply coolant to the radiator 126 at an increased flow rate.

As such, when the flow rate of coolant that is supplied to the radiator 126 is increased, the temperature of coolant circulating between the radiator and the engine, that is, the coolant temperature can be further lowered, and the coolant temperature and the radiator temperature can be prevented from rising even when the coolant temperature is not high.

Additionally, due to the fact that the temperature of the radiator 126 is prevented from rising, the temperature of the air conditioner 143 disposed close to the radiator can be prevented from rising, and the refrigerant pressure can be prevented from rising due to a rise in temperature of the air conditioner condenser 143.

As a result, it is possible to improve the cooling efficiency and the cooling performance in the condenser 143, while ensuring the condensation performance of the condenser.

Table 1 shows one example of setting the opening ratio of the radiator valve 112 as a control target in accordance with the refrigerant pressure in the control method according to the embodiment of the present disclosure, and thus the values in Table 1 are only illustrative. Accordingly, the present disclosure is not limited to Table 1, and the values in Table 1 can be tuned in various ways according to specifications and conditions of the vehicle and integrated thermal management system through a test and evaluation process.

While control of the integrated thermal management system based on the air conditioner refrigerant pressure is performed as described above, the controller 100 compares a difference value between the vehicle interior temperature detected by the interior temperature sensor 94 and an air conditioning target temperature with a set temperature difference (ΔT) in S20.

At this time, when the difference value between the vehicle interior temperature and the and the air conditioning target temperature is less than the set temperature difference (ΔT), the controller 100 terminates the control process. When the difference value does not reach the set temperature difference, the controller 100 maintains the control of the integrated thermal management system based on the air conditioner refrigerant pressure.

On the other hand, in S13, when it is determined that any one of the above conditions is not fulfilled, the controller 100 performs control of the integrated thermal management system based on the current engine coolant temperature detected by the water temperature sensor 91.

In particular, the controller 100 determines whether the engine coolant temperature is in a range of greater than a second set temperature X2 and less than a third set temperature X3 in S14. At this time, when the engine coolant temperature is in the range of greater than the second set temperature X2 and less than the third set temperature X3, the controller 100 opens the ATF warmer valve 114, which is the third valve of the integrated flow control valve 110, and controls an opening ratio of the ATF warmer valve 114 based on the detected engine coolant temperature in S15.

That is, the controller 100 determines the opening ratio of the ATF warmer valve 114 using the setting information based on the engine coolant temperature detected by the water temperature sensor 91 and then controls opening and closing operations of the ATF warmer valve 114 based on the determined opening ratio. This makes it possible to control the flow rate of coolant that is heat-exchanged with transmission oil based on the coolant temperature.

On the other hand, when it is determined that the engine coolant temperature is not in the range of greater than the second set temperature X2 and less than the third set temperature X3 in S14, as shown in FIG. 4B, the controller 100 determines whether the engine coolant temperature detected by the water temperature sensor 91 is in a range of greater than a fourth set temperature X4 and less than a fifth set temperature X5 in S16.

At this time, when the engine coolant temperature is in the range of greater than the fourth set temperature X4 and less than the fifth set temperature, the controller 100 performs control of the integrated thermal management system (ITM) (that is, control of the opening and closing operations of the integrated flow control valve) for allowing the engine coolant temperature to follow a target coolant temperature (for example, 95° C. to 105° C.) for operating the engine at an engine operating point in S17.

However, when it is determined that the engine coolant temperature is not in the range of greater than the fourth set temperature X4 and less than the fifth set temperature X5 in S16, particularly when the engine coolant temperature is greater than or equal to the fifth set temperature X5, the controller 100 opens the radiator valve 112, which is the first valve of the integrated flow control valve 110, and controls the opening ratio of the radiator valve 112 based on detected engine coolant temperature.

That is, the controller 100 determines the opening ratio of the radiator valve 112 using the setting information based on the engine coolant temperature detected by the water temperature sensor 91 and then controls opening and closing operations of the radiator valve 112 based on the determined opening ratio. This makes it possible to control the flow rate of coolant that is supplied to the radiator 126, thus controlling the engine coolant temperature to maintain at an appropriate temperature level.

Accordingly, in the control method for the integrated thermal management system according to the present disclosure, when the ambient temperature is greater than the air conditioning target temperature set by the driver in a state where the ambient temperature is greater than or equal to a predetermined level, and thus the interior air conditioning is required (with the air conditioning blower on), an integrated thermal management control mode based on the air conditioner refrigerant pressure (cooling priority mode) is entered, thus preventing a deterioration in the condensation performance of the condenser and a rise in the refrigerant pressure.

Therefore, according to the control method for the integrated thermal management system according to the present disclosure, it is possible to prevent an excessive rise in refrigerant pressure, thus improving air conditioning performance and merchantability of the vehicle.

Further, according to the control method for the integrated thermal management system according to the present disclosure, it is possible to efficiently control engine coolant and air conditioner refrigerant pressure in a situation where cooling load is large, to reduce energy consumption of an air conditioner compressor, and to improve real-world fuel efficiency of the vehicle.

Although the exemplary embodiments of the present disclosure have been described for illustrative purposes, those skilled in the art will appreciate that various modifications, additions and substitutions are possible, without departing from the scope and spirit of the disclosure as disclosed in the accompanying claims.

What is claimed is:

1. A control method for an integrated thermal management system of a vehicle, the method comprising:
   comparing, by a controller, an engine coolant temperature with a predetermined first set temperature after vehicle start;
   when the engine coolant temperature is greater than the first set temperature, comparing, by the controller, an ambient temperature with a set ambient temperature and comparing, by the controller, an air conditioner refrigerant pressure with a set pressure; and
   when the ambient temperature is greater than the set ambient temperature and the air conditioner refrigerant pressure is greater than the set pressure, controlling, by the controller, opening and closing operations of an integrated flow control valve based on the air conditioner refrigerant pressure so as to increase a flow rate of coolant that is supplied to a radiator through the integrated flow control valve.

2. The method of claim 1, wherein in comparing the ambient temperature with the set ambient temperature and comparing the air conditioner refrigerant pressure with the set pressure, it is determined that an air conditioning blower is in an on-state, and
   when the ambient temperature is greater than the set ambient temperature, the air conditioner refrigerant pressure is greater than the set pressure, and the air conditioning blower is in the on-state, in controlling the opening and closing operations of the integrated flow control valve based on the air conditioner refrigerant pressure, the opening and closing operations of the integrated flow control valve are controlled based on the air conditioner refrigerant pressure.

3. The method of claim 2, further comprising:
   when any one of a condition that the ambient temperature is greater than the set ambient temperature, a condition that the air conditioner refrigerant pressure is greater than the set pressure, and a condition that the air conditioner blower is in the on-state is not fulfilled,
   controlling the opening and closing operations of the integrated flow control valve based on the engine coolant temperature.

4. The method of claim 3, wherein in the controlling the opening and closing operations of the integrated flow control valve based on the engine coolant temperature, when the engine coolant temperature is in a range of greater than a second set temperature and less than a third set temperature, the opening and closing operations of the integrated flow control valve are controlled to allow the coolant to be supplied to an automatic transmission fluid (ATF) warmer in which the coolant is heat-exchanged with transmission oil, and a flow rate of the coolant supplied to the ATF warmer is controlled based on the engine coolant temperature.

5. The method of claim 4, wherein in controlling the opening and closing operations of the integrated flow control valve based on the engine coolant temperature, when the engine coolant temperature is in a range of greater than a fourth set temperature and less than a fifth set temperature, control of the opening and closing operations of the integrated flow control valve is performed such that the engine coolant temperature follows a target coolant temperature for operating an engine at an engine operating point.

6. The method of claim 5, wherein in controlling the opening and closing operations of the integrated flow control valve based on the engine coolant temperature, when the engine coolant temperature is greater than or equal to the fifth set temperature, the opening and closing operations of the integrated flow control valve are controlled to allow the cooling water to be supplied to the radiator, and the flow rate of the coolant supplied to the radiator is controlled based on the engine coolant temperature.

7. The method of claim 2, wherein in controlling the opening and closing operations of the integrated flow control valve based on the air conditioner refrigerant pressure, the opening ratio of the integrated flow control valve is controlled to be increased when the air conditioner refrigerant pressure rises so as to increase the flow rate of the coolant that is supplied to the radiator.

8. The method of claim 1, wherein in controlling the opening and closing operations of the integrated flow control valve based on the air conditioner refrigerant pressure, the opening ratio of the integrated flow control valve is controlled to be increased when the air conditioner refrigerant pressure rises so as to increase the flow rate of the coolant that is supplied to the radiator.

9. The method of claim 1, wherein in comparing the engine coolant temperature with the predetermined first set temperature after the vehicle start, when the engine coolant water temperature is less than or equal to the first set temperature, the opening and closing operations of the integrated flow control valve are controlled to allow the coolant to be supplied to an exhaust heat recovery system, such that the coolant is heated in the exhaust heat recovery system by heat exchange with exhaust gas and then is supplied to an engine for engine warm-up.

10. A non-transitory computer readable medium containing program instructions executed by a processor, the computer readable medium comprising:
program instructions that compare an engine coolant temperature with a predetermined first set temperature after vehicle start;
program instructions that, when the engine coolant temperature is greater than the first set temperature, compare an ambient temperature with a set ambient temperature and compare an air conditioner refrigerant pressure with a set pressure; and
program instructions that, when the ambient temperature is greater than the set ambient temperature and the air conditioner refrigerant pressure is greater than the set pressure, control opening and closing operations of an integrated flow control valve based on the air conditioner refrigerant pressure so as to increase a flow rate of coolant that is supplied to a radiator through the integrated flow control valve.

\* \* \* \* \*